G. KESSLER.
DUMPING-WAGON.

No. 178,782.  Patented June 13, 1876.

Witnesses  
Saml. J. VanStavoren  
Jos. C. Connolly

Inventor  
George Kessler  
By Connolly Bros., Attorneys

UNITED STATES PATENT OFFICE.

GEORGE KESSLER, OF PHILADELPHIA, PENNSYLVANIA.

IMPROVEMENT IN DUMPING-WAGONS.

Specification forming part of Letters Patent No. 178,782, dated June 13, 1876; application filed March 4, 1876.

*To all whom it may concern:*

Be it known that I, GEORGE KESSLER, of Philadelphia, in the county of Philadelphia and State of Pennsylvania, have invented certain new and useful Improvement in Dumping-Wagons; and do hereby declare the following to be a full, clear, and exact description of the invention, such as will enable others skilled in the art to which it pertains to make and use it, reference being had to the accompanying drawings, which form part of this specification, in which—

Figure 1:
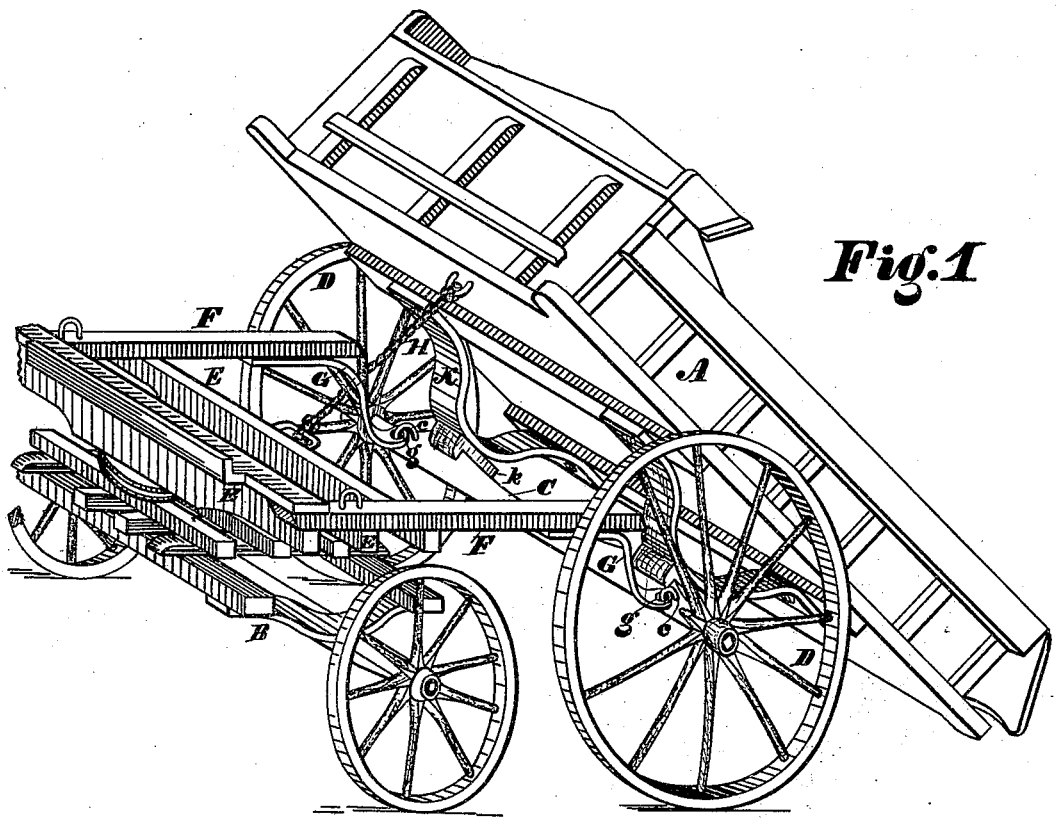
Figure 2:
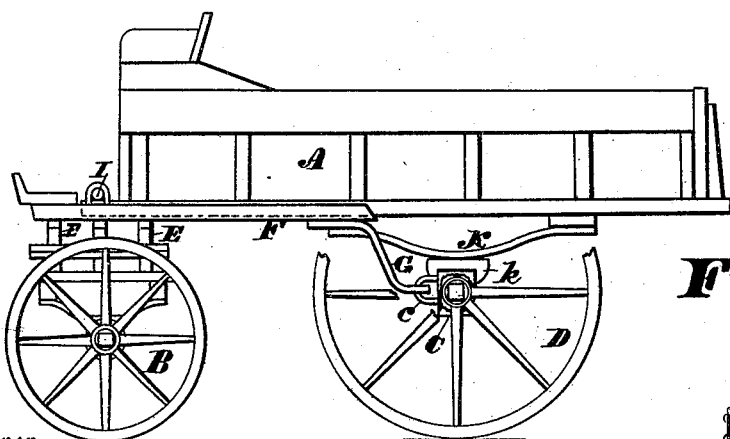

Figure 1 is a perspective of my invention with the body of the wagon tilted. Fig. 2 is a side elevation of the same with the body of the wagon in its normal position.

My invention consists in the peculiar construction and combination of parts, having reference particularly to connecting the hind axle to skids which proceed backwardly from the circle-bars in such a manner that said axle will be free to turn when the body is tilted. The connection between said axle and skid is effected by curved arms or goose-necks, the body, when not tilted, resting on the upper circle-bars between said skids.

In the accompanying drawing, A represents the body of my improved dumping-wagon, B the front running-gear, and C the hind axle, sustained in wheels D D. E E are the upper circle-bars, from which proceed, backwardly, skids F F, said skids being parallel and just far enough apart to allow the body A to rest snugly between them on the bars E E. G G are curved arms or goose-necks, rigidly secured to the skids F F, and connected to the axle C by means of staples or equivalent clips $c\ c$, passing through eyes $g\ g$ in said arms. H is a rope or chain to limit the tilt of the body, and I the key-stick, by means of which said body is secured in the usual manner to prevent dumping. The body is secured to the springs K K, which are firmly fastened to the axle C by blocks or equivalent devices, $k\ k$.

As will be readily perceived, while the wagon is being loaded or in motion, the body is sustained in front upon the circle-bars E E, and in the rear upon the springs K K. When it is desired to dump, the key-stick I is withdrawn, whereupon the body assumes the position shown in Fig. 1, the axle C turning in the wheels D D with said body. The chain or rope H serves to limit the tilt of the body, and thus prevent injury to its tail end caused by violently striking a curb-stone or the ground.

I claim—

A dumping-wagon, A, having skids F extending rearwardly from the front running-gear, for the support of the front part of the body A, said skids being secured to curved arms G, which descend to the rear axle, and are connected therewith by a clip-joint, the body being fixedly attached to the springs, and the latter in turn firmly fastened to a rotating axle, so that when the body is in its normal position it will be sustained in front by the skids, and that when dumped said body, springs, and hind axle will turn together without changing their relative arrangement, substantially as described.

In testimony that I claim the foregoing I have hereunto set my hand this 2d day of March, 1876.

GEORGE KESSLER.

Witnesses:
M. DANL. CONNOLLY,
CHAS. F. VAN HORN.